US012291693B2

(12) United States Patent
Mui et al.

(10) Patent No.: US 12,291,693 B2
(45) **Date of Patent: *May 6, 2025**

(54) STABLE AQUEOUS SURFACTANT COMPOSITIONS

(71) Applicant: The Procter & Gamble Company, Cincinnati, OH (US)

(72) Inventors: Michael David O'Young Mui, Mason, OH (US); Jonathan Javier Calderas, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/634,230

(22) Filed: Apr. 12, 2024

(65) Prior Publication Data

US 2024/0263102 A1 Aug. 8, 2024

Related U.S. Application Data

(63) Continuation of application No. 18/334,004, filed on Jun. 13, 2023, now Pat. No. 11,999,924.

(60) Provisional application No. 63/367,067, filed on Jun. 27, 2022.

(51) Int. Cl.

| | |
|---|---|
| ***C11D 1/00*** | (2006.01) |
| ***C11D 3/00*** | (2006.01) |
| ***C11D 3/20*** | (2006.01) |
| ***C11D 3/43*** | (2006.01) |
| ***C11D 17/00*** | (2006.01) |

(52) U.S. Cl.

CPC ............ *C11D 1/002* (2013.01); *C11D 3/0047* (2013.01); *C11D 3/2031* (2013.01); *C11D 3/43* (2013.01); *C11D 17/0008* (2013.01)

(58) Field of Classification Search

CPC ..... C11D 1/002; C11D 3/2031; C11D 3/0047; C11D 3/43

See application file for complete search history.

(56) References Cited

U.S. PATENT DOCUMENTS

| | | | |
|---|---|---|---|
| 3,986,830 | A | 10/1976 | Kaufman |
| 4,268,406 | A | 5/1981 | Obrien |
| 4,518,593 | A | 5/1985 | Juvin |
| 4,891,222 | A | 1/1990 | Eichhoefer |
| 5,498,295 | A | 3/1996 | Murch et al. |
| 5,500,143 | A | 3/1996 | Murch et al. |
| 5,518,736 | A | 5/1996 | Magdassi |
| 5,549,758 | A | 8/1996 | Murch et al. |
| 5,631,290 | A | 5/1997 | Almond et al. |
| 5,690,950 | A | 11/1997 | Beadle et al. |
| 5,705,461 | A | 1/1998 | Murch et al. |
| 5,753,593 | A | 5/1998 | Pullen |
| 5,998,475 | A | 12/1999 | James |
| 5,998,484 | A | 12/1999 | Zobitne et al. |
| 6,004,569 | A | 12/1999 | Bessette |
| 6,048,836 | A | 4/2000 | Romano et al. |
| 6,114,163 | A | 9/2000 | Drauz |
| 6,231,865 | B1 | 5/2001 | Hsu |
| 6,531,163 | B1 | 3/2003 | Bessette |
| 6,537,955 | B1 | 3/2003 | Raso et al. |
| 6,548,085 | B1 | 4/2003 | Zobitne et al. |
| 6,627,590 | B1 | 9/2003 | Sherry |
| 7,150,876 | B2 * | 12/2006 | Chaudhuri ............. A61Q 17/04 424/401 |
| 7,531,188 | B2 | 5/2009 | Jones, Jr. |
| 8,968,757 | B2 | 3/2015 | Man et al. |
| 9,326,524 | B1 | 5/2016 | Jack et al. |
| 9,578,876 | B2 | 2/2017 | Man et al. |
| 10,149,481 | B2 | 12/2018 | Bissinger et al. |
| 10,322,137 | B2 | 6/2019 | Bilodeau et al. |
| 10,743,535 | B2 | 8/2020 | Harkins et al. |
| 11,999,924 | B2 | 6/2024 | Mui |
| 12,035,713 | B2 | 7/2024 | Enan |
| 2001/0055628 | A1 | 12/2001 | Hsu |
| 2002/0034556 | A1 | 3/2002 | Khazan |
| 2003/0060379 | A1 | 3/2003 | Souter et al. |
| 2003/0152603 | A1 | 8/2003 | Johnson |
| 2004/0253287 | A1 | 12/2004 | Denton |
| 2005/0170988 | A1 | 8/2005 | Maillefer et al. |
| 2006/0057075 | A1 * | 3/2006 | Arkin ...................... A61P 17/18 424/47 |
| 2007/0098750 | A1 | 5/2007 | Bessette |
| 2007/0190094 | A1 | 8/2007 | Bessette |

(Continued)

FOREIGN PATENT DOCUMENTS

| | | | |
|---|---|---|---|
| CA | 2242411 | A1 | 7/1997 |
| CN | 1513317 | A | 7/2004 |

(Continued)

OTHER PUBLICATIONS

PCT Search Report and Written Opinion for PCT/US2023/068323 dated Aug. 31, 2023, 8 pages.
All Office Actions; U.S. Appl. No. 17/865,953, filed Jul. 15, 2022.
All Office Actions; U.S. Appl. No. 18/082,891, filed Dec. 16, 2022.
All Office Actions; U.S. Appl. No. 18/334,004, filed Jun. 13, 2023.
All Office Actions; U.S. Appl. No. 18/334,017, filed Jun. 13, 2023.
All Office Actions; U.S. Appl. No. 18/334,055, filed Jun. 13, 2023.
Aunt Fannie's, "All-Purpose Pest Remedy", Online retrieved from "https://auntfannies.com/product/all-purpose-pest-remedy/", No Known Date, 06 Pages.
Ecologic, "Ant & Roach Killer2 (Aerosol)", Online retrieved from "https://www.ecologicliving.com/products/home/ant-and-roach-killer-aerosol.aspx/", No Known Date, 03 Pages.

(Continued)

*Primary Examiner* — Peter F Godenschwager
*Assistant Examiner* — M. Reza Asdjodi
(74) *Attorney, Agent, or Firm* — Amanada Herman Berghauer

(57) ABSTRACT

The present disclosure relates to stable aqueous compositions of alkyl sulfates, which are suitable for numerous commercial applications due to their favorable cleaning and foaming properties. More particularly, the disclosure relates to stable aqueous compositions of alkyl sulfates in combination with select hydrophobic agents, such as essential oils.

18 Claims, No Drawings

(56) References Cited

U.S. PATENT DOCUMENTS

| | | | | |
|---|---|---|---|---|
| 2007/0251020 | A1 | 11/2007 | Stockman et al. | |
| 2008/0020078 | A1 | 1/2008 | Enan | |
| 2008/0095813 | A1 | 4/2008 | Kiec | |
| 2008/0187607 | A1 | 8/2008 | Bessette | |
| 2008/0220031 | A1* | 9/2008 | Wunsch | A61K 8/817 424/59 |
| 2009/0054294 | A1 | 2/2009 | Theiler et al. | |
| 2009/0099135 | A1 | 4/2009 | Enan | |
| 2010/0003341 | A1 | 1/2010 | Besendorfer | |
| 2011/0236589 | A1 | 9/2011 | Streisfeld | |
| 2012/0087987 | A1 | 4/2012 | Man et al. | |
| 2012/0321587 | A1 | 12/2012 | Rosen et al. | |
| 2013/0122120 | A1 | 5/2013 | Angjeli | |
| 2013/0149400 | A1 | 6/2013 | Lloyd et al. | |
| 2013/0237419 | A1 | 9/2013 | Shao et al. | |
| 2013/0336916 | A1 | 12/2013 | Zhong | |
| 2014/0013654 | A1 | 1/2014 | Burke | |
| 2015/0147288 | A1 | 5/2015 | Zhong | |
| 2017/0056318 | A1* | 3/2017 | Dieye | A61K 8/25 |
| 2018/0271775 | A1* | 9/2018 | Dieye | A61K 8/0241 |
| 2019/0002613 | A1* | 1/2019 | Hsu | C08J 3/05 |
| 2019/0053486 | A1 | 2/2019 | Harkins et al. | |
| 2019/0070095 | A1 | 3/2019 | Stone et al. | |
| 2019/0093055 | A1 | 3/2019 | Gori | |
| 2019/0274312 | A1 | 9/2019 | Bissinger et al. | |
| 2019/0343757 | A1* | 11/2019 | Dieye | A61K 8/25 |
| 2020/0000701 | A1 | 1/2020 | Uribe et al. | |
| 2020/0323758 | A1 | 10/2020 | Karagianni et al. | |
| 2020/0353114 | A1* | 11/2020 | Miracle | A61L 9/14 |
| 2020/0390110 | A1 | 12/2020 | Lane | |
| 2021/0046023 | A1* | 2/2021 | Ciotti | A61K 47/186 |
| 2023/0042086 | A1 | 2/2023 | Calderas et al. | |
| 2023/0045266 | A1* | 2/2023 | Calderas | A01N 25/04 |
| 2023/0189820 | A1* | 6/2023 | Mui | A01N 31/06 424/747 |
| 2023/0320364 | A1 | 10/2023 | Calderas | |
| 2023/0320365 | A1 | 10/2023 | Mui | |
| 2023/0416640 | A1* | 12/2023 | Mui | C11D 1/002 |
| 2024/0051905 | A1* | 2/2024 | Pelzer | C07C 49/653 |
| 2024/0263102 | A1* | 8/2024 | Mui | C11D 3/0047 |

FOREIGN PATENT DOCUMENTS

| | | | | |
|---|---|---|---|---|
| CN | 1883449 | A * | 12/2006 | |
| DE | 2752140 | A1 | 5/1978 | |
| DE | 19631594 | A1 | 2/1998 | |
| EP | 0495684 | A1 | 7/1992 | |
| EP | 0629345 | A1 | 12/1994 | |
| EP | 0945066 | A1 | 9/1999 | |
| JP | 2005082502 | A | 3/2005 | |
| KR | 20170082444 | A | 7/2017 | |
| WO | 9628033 | A1 | 9/1996 | |
| WO | 9963818 | A1 | 12/1999 | |
| WO | 0195726 | A1 | 12/2001 | |
| WO | 0209524 | A1 | 2/2002 | |
| WO | 2005070213 | A2 | 8/2005 | |
| WO | 2007056813 | A1 | 5/2007 | |
| WO | 2007063267 | A1 | 6/2007 | |
| WO | WO-2015164949 | A1 * | 11/2015 | A61K 8/0241 |
| WO | 2018026499 | A1 | 2/2018 | |
| WO | 2019086799 | A1 | 5/2019 | |
| WO | 2021096947 | A1 | 5/2021 | |
| WO | 2022119738 | A1 | 6/2022 | |
| WO | WO-2022129167 | A1 * | 6/2022 | C07C 35/23 |

OTHER PUBLICATIONS

Ecologic, "Home Insect Control2 (Ready-To-Use)", Online retrieved from "https://www.ecologicliving.com/Products/Home/Home-Insect-Control-Ready-To-Use-32-Oz.aspx/a", No Known Date, 03 Pages.

Gal. Natural Mosquito and Insect Misting Concentrate for Backyard Misting Systems, Online retrieved from "https://www.homedepot.com/p/1-Gal-Natural-Mosquito-and-Insect-Misting-Concentrate-for-Backyard-Misting-Systems-SMC2-GG/307292978/a", No Known Date, 03 Pages.

Gillilan et al., "Improvement of U.S. EPA Minimum Risk Essential Oils' Pesticide Activity Through Surfactant Enhancement and Synergy (dissertation)", Doctor of Philosophy, Ohio State University, Horticulture and Crop Science, 2012, pp. 177.

Isman Murray B. et al; "Bioinsecticides based on plant essential oils: A short review" Zeitschrift Fuer Naturforschung. C, A Journal on Biosciences, vol. 75, No. 7-8, XP055825088, ISSN: 0939-5075, dated Apr. 24, 2020, pp. 179-182.

Manpreet Kaur Makkar et al., "Evaluation of Mentha arvensis essential oil and its major constituents for fungitoxicity", J Food Sci Technol Sep. 2018; 55(9): 3840-3844. doi: 10.1007/s13197-018-3291-y, dated Jul. 11, 2018, 9 Pages.

Opender Koul et al; Essential oils as green pesticides: Potential and constraints, Biopestic Int., vol. 4, No. 1, XP055020764, ISSN:0973-483X, dated Jan. 1, 2008, pp. 63-84.

Ortho® Home Defense® Crawling Bug Killer with Essential Oils, Online retrieved from "https://ortho.com/en-us/shop/insects/ortho-home-defense-crawling-bug-killer-with-essential-oils/0203001.html/a", No Known Date,04 Pages.

Fan et al., "Influences of host volatiles on feeding behaviour of the Japanese pine sawyer, *Monochamus alternatus*," J. Appl. Entomol. 130(4), 238-244 (2006).

Hori et al., "Repellency of Rosemary Oil and Its Components against the Onion Aphid", Neotoxoptera formosana (Takahashi) (Homoptera, Aphididae), Applied Entomology and Zoology, 1997, vol. 32, Issue 2, pp. 303-310.

Isman et al., Insecticidal Activities of Commercial Rosemary Oils (*Rosmarinus officinalis*.) Against Larvae of Pseudaletia unipuncta. and Trichoplusia ni. in Relation to Their Chemical Compositions, Pharmaceutical Biology, 46:1-2, 82-87(2008).

Jirovetz et al., "Antimicrobial testing and gas chromatographic analysis of pure oxygenated monoterpenes 1,8-cineole, a-terpineol, terpinen-4-01 and camphor as well as target compounds in essential oils of pine (*Pinus pinaster*), rosemary (*Rosmarinus officinalis*), tea tree (*Melaleuca alternifolia*)," Scientia Pharmaceutica (Sci. Pharm.) 73, 27-39 (2005).

M. Hmamouchi, J. Hamamouchi, M. Zouhdi & J. M. Bessiere (2001) "Chemical and Antimicrobial Properties of Essential Oils of Five Moroccan Pinaceae, Journal of Essential Oil Research", 13:4, 298-302, DOI: 10.1080/10412905.2001.9699699.

Moretti et al., "Essential Oil Formulations Useful as a New Tool for Insect Pest Control," AAPS PharmSciTech 2002; 3 (2) article 13.

Ranaweera et al., "Mosquito-larvicidal activity of Ceylon citronella (*Cymbopogon nardus* (L.) Rendle) oil fractions," J. Natn. Sci. Coun. Sri Lanka 1996 24(4): 247-252.

Xue et al., "Laboratory evaluation of 21 insect repellents as larvicides and as oviposition deterrents(Diptera: Culicidae)," Journal of the American Mosquito Control Association, 22(1): 126-130, 2006.

Mosquito & Tick Control Organic Insecticide, online retrieved from "http://www.gnpd.com", dated Apr. 2010, p. 3.

Ortho Home Defense Crawling Bug Killer with Essential Oils, online retrieved from "https://www.google.com/search? q=ortho+home+defense+crawling+bug+killer+with+essential+oils&sca_esv=124b5514237b3ef4&source=lnt&tbs=cdr%3A1%2Ccd_min%3A%2Ccd_max%3A7%2F15%2F2020&tbm=", Year: 2024, p. 6.

* cited by examiner

STABLE AQUEOUS SURFACTANT COMPOSITIONS

CROSS REFERENCE TO RELATED APPLICATION

This application is a continuation of U.S. patent application Ser. No. 18/334,004 filed on Jun. 13, 2023, which claims the benefit, under 35 U.S.C. § 119(c), of U.S. Provisional Patent Application Ser. No. 63/367,067 filed on Jun. 27, 2022, the entire disclosures of all of which are fully incorporated by reference herein.

FIELD OF THE INVENTION

The present disclosure relates to stable aqueous compositions of alkyl sulfates, which are suitable for numerous commercial applications due to their favorable cleaning and foaming properties. More particularly, the disclosure relates to stable aqueous compositions of alkyl sulfates in combination with select hydrophobic agents, such as essential oils.

BACKGROUND OF THE INVENTION

Alkyl sulfate surfactants are widely used in various commercial applications, from dish washing detergents to shower gels to shampoos, because of their desirable cleaning and foaming properties. However, the use of alkyl sulfate surfactants in aqueous compositions poses formulation challenges, due to the limited solubility of alkyl sulfate surfactants in water.

Aqueous compositions containing alkyl sulfates may exhibit clouding and precipitation of undissolved alkyl sulfate, even at temperatures above 10° C. The reason for this is the relatively poor solubility of an alkyl sulfate in water at temperatures below its Krafft temperature, which is defined as the temperature at which the surfactant concentration of the saturated surfactant solution equals its critical micelle concentration (CMC), which is the lowest surfactant concentration at which micelles form. At the Krafft temperature, solubility increases dramatically and micelles form. The Krafft temperature of sodium dodecyl sulfate is reported as 16° C. in *Surfactants and Interfacial Phenomena* (Milton Rosen, Wiley 1978). Consequently, at temperatures below about 16° C., alkyl sulfate solubility is very low and alkyl sulfate behaves as a regular organic molecule. And, alkyl sulfate may present product stability challenges, when formulated into a product that is stored, transported, or intended for use at temperatures below its Krafft temperature.

In order to maintain the stability of surfactant compositions at low temperatures, it is known to lower Krafft point by mixing different surfactants, for example, a mixture of an alkyl sulfate, such as sodium dodecyl sulfate (SDS), and an amphoteric surfactant, such as palmitoylsulfobetaine. However, for various reasons, including to reduce manufacturing and formulation complexity, it may be preferable to formulate a single-surfactant composition that includes a surfactant system that consists essentially of alkyl sulfate surfactant, particularly a non-ethoxylated alkyl sulfate surfactant. Accordingly, there is a need for a stable aqueous single-surfactant composition that includes a surfactant system consisting essentially of non-ethoxylated alkyl sulfate surfactant.

SUMMARY OF THE INVENTION

A stable aqueous surfactant composition comprising:

a. from about 1% to about 30% by weight of the composition of a surfactant system consisting essentially of an alkyl sulfate, preferably a C6-C20 alkyl sulfate, more preferably a sodium C6-C20 alkyl sulfate;

b. from about 0.05% to about 15% by weight of the composition of a hydrophobic agent, preferably selected from the group consisting of essential oils, perfumes, constituents thereof, and combinations thereof; and c. from about 70% to about 90% by weight of the composition of water;

d. optional ingredients selected from pH adjusting agents, calcium salts, boric acid, enzymes, dyes, colorants, preservatives, fluorescent whitening agents, bluing agents, defoamers, bleaches, thickeners, polymers, preferably anti-redeposition polymers, solvents, chelants, gums, binders, and combination thereof;

wherein the ratio of hydrophobic active to alkyl sulfate is about 1:0.66 to about 1:20.

A stable, concentrated aqueous surfactant comprising:

a. greater than 30% to about 75% by weight of the composition of a surfactant system consisting essentially of an alkyl sulfate, preferably a C6-C20 alkyl sulfate, more preferably a sodium C6-C20 alkyl sulfate;

b. from about 5% to about 40% by weight of the composition of a hydrophobic agent, preferably selected from the group consisting of essential oils, perfumes, constituents thereof, and combinations thereof; and c. from about 10% to about 65% by weight of the composition of water;

wherein the ratio of hydrophobic active to alkyl sulfate is about 1:0.66 to about 1:20.

DETAILED DESCRIPTION OF THE INVENTION

Alkyl sulfate surfactant, such as sodium dodecyl sulfate, is a common component in hand soap, toothpastes, shampoos, and body washes, due to its ability to remove oily residues and its foaming properties. However, the use of alkyl sulfate surfactants in aqueous compositions poses formulation challenges, due to the limited solubility of alkyl sulfate surfactants in water. In order to increase the solubility of alkyl sulfate surfactants at low temperatures, it is known to combine alkyl sulfate with other surfactants, for example, a mixture of an alkyl sulfate, such as sodium dodecyl sulfate (SDS), and an amphoteric surfactant, such as palmitoylsulfobetaine.

Consumers are seeking effective cleaning, hygiene, cosmetic, and personal care products that have simpler formulations, e.g., single-surfactant formulations. Some consumers may also prefer substantially clear and/or colorless products. Consumers are also seeking stable products that do not require shaking or mixing by the consumer before use and can be readily (and, over time, consistently) dispensed And, manufacturers and formulators seek to produce formulations (both ready-to-use and concentrated, e.g., pastes) that exhibit low temperature stability, during shipping, storage, and on the store shelf. Manufacturers may also seek stable concentrated pastes that can be readily shipped and/or do not require premixing or additional processing (before combining with remaining product ingredients).

Features and benefits of the various embodiments of the present invention will become apparent from the following description, which includes examples of specific embodiments intended to give a broad representation of the invention. Various modifications will be apparent to those skilled in the art from this description and from practice of the invention. The scope is not intended to be limited to the particular forms disclosed and the invention covers all modifications, equivalents, and alternatives falling within the spirit and scope of the invention as defined by the claims.

As used herein, articles such as "a" and "an" when used in a claim, are understood to mean one or more of what is claimed or described.

As used herein, the terms "include", "includes" and "including" are meant to be non-limiting.

As used herein, the term "natural oils" means oils that are derived from plant or algae matter. Natural oils are not based on kerosene or other fossil fuels.

As used herein, the term "stable" refers to an aqueous surfactant composition that is substantially clear and free from phase separation or precipitation, where no agitation or mixing is required to use the composition for its application.

As used herein, "substantially free of" or "substantially free from" refers to either the complete absence of an ingredient or a minimal amount thereof merely as impurity or unintended byproduct of another ingredient. A composition that is "substantially free" of/from a component means that the composition comprises less than about 0.5%, less than about 0.25%, less than about 0.1%, less than about 0.05%, or less than about 0.01% by weight of the composition, of the component.

Volatile Organic Compounds (VOCs) are identified by the U.S. Environmental Protection Agency (EPA) as organic compounds that participate in atmospheric photochemical reactions, with the exception of compounds that have negligible photochemical reactivity. VOCs are generally emitted as gases from certain solids or liquids. EPA regulations define a chemical as "VOC-exempt" if it has vapor pressure of less than 0.1 millimeters of mercury (at 20° C.). If the vapor pressure is unknown, a chemical is defined as "VOC-exempt" if, a) it consists of more than 12 carbon atoms; or, b) it has a melting point higher than 20° C. and does not sublime (i.e., does not change directly from a solid into a gas without melting).

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated. It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All weights, measurements and concentrations herein are measured at 25 degrees Celsius (° C.) and 50% relative humidity, unless otherwise specified.

Aqueous Surfactant Composition

The aqueous surfactant composition may comprise from about 70% to about 90%, or from about 75% to about to about 85%, or from about 78% to about 83%, by weight of the composition of water. Alternatively, the aqueous surfactant composition may be more concentrated and comprise from about 5% to about 65%, or from about 10% to about 65%, or from about 10% to about 50%, or from about 10% to about 30%, by weight of the composition, of water.

The aqueous surfactant composition may be a micellar dispersion or an oil-in-water emulsion.

The aqueous surfactant composition may comprise particles having an intensity mean particle size of from about 2 nm to about 500 nm, alternatively from about 4 nm to about 400 nm, alternatively from about 5 nm to about 100 nm. The aqueous surfactant composition may comprise particles having an intensity mean particle size of less than about 1 micron, preferably less than about 500 nm. Mean intensity particle size can be measured according to the Particle Size Test Method described hereafter.

The aqueous surfactant composition may be clear, as clarity may connote purity to the user. The aqueous surfactant composition may be substantially free of a dye or colorant. The aqueous surfactant composition may be provided to the consumer in the form of a concentrated composition, which is mixed with a diluent, e.g., water, prior to use, or a ready-to-use composition, which need not be diluted by a consumer before use.

The aqueous surfactant composition may have a relatively high level of clarity (i.e., low turbidity). Some consumers prefer a clear product versus a product that is cloudy or murky (i.e., higher turbidity). The aqueous surfactant composition may exhibit a turbidity of less than about 20 NTU, alternatively less than about 15 NTU, alternatively less than about 10 NTU, alternatively less than about 8 NTU. The aqueous surfactant composition may exhibit a turbidity of from about 1.5 to about 20 NTU, alternatively from about 1.5 to about 15 NTU, alternatively from about 1.5 to about 10 NTU, alternatively from about 1.5 to about 8 NTU. Turbidity of the compositions is measured with a laboratory turbidity meter as described in the Turbidity Method below.

The aqueous surfactant composition may be substantially colorless. Some consumers prefer a colorless or substantially colorless product. Color may be measured by any colorimetric or spectrometric method known in the art. Suitable colorimetric analytical methods include, for example, the Gardner color scale (according to American Society for Testing and Materials ("ASTM") method ASTM D1544, D6166 and/or American Oil Chemists' Society ("AOCS") method AOCS Td-1a-64); the CIELAB color scale (according to ASTM D5386-93b); the American Public Health Association ("APHA") color scale (according to ASTM D1209 or AOCS Td-1b-64); the Saybolt color scale (according to ASTM D156 or D6045); or the Lovibond (red) scale (according to AOCS Cc-13b-45). The CIELAB color scale may be used to quantify the color of an aqueous surfactant composition. The CIELAB color scale may also be referred to as L*a*b*, a color scale defined by the International Commission on Illumination (abbreviated CIE) in 1976. The CIELAB color scale expresses color as three values: L* for perceptual lightness, and a* and b* for the four unique colors of human vision: red, green, blue, and yellow, where the b* value represents blue/yellow color. It should be noted that the present disclosure is not limited to any specific colorimetric measurement and the color observed may be measured by any suitable colorimetric method.

The aqueous surfactant composition may have a b* value of from about 0 to about 5, alternatively from about 0 to about 4, alternatively from about 0 to about 3. The aqueous surfactant composition may have a b* value of from about 0.4 to about 5, alternatively from about 0.4 to about 4, alternatively from about 0.4 to about 3.

The aqueous surfactant composition may comprise less than or equal to about 90% by weight VOCs, or less than or equal to about 80% by weight VOCs, or less than or equal to about 70% by weight VOCs, or less than or equal to about 50% by weight VOCs, or less than or equal to about 40% by weight VOCs. The VOC level may be from about 0 wt. % to about 35 wt. %, or from about 2 wt. % to 20 wt. %, or from about 0 wt. % to about 3 wt. %. VOCs can be measured according to the California Air Resources Board (CARB) Method 310 for VOC determination (May 25, 2018). VOCs may come from one or more ingredients in the composition, including a solvent and/or an essential oil or perfume.

The compositions disclosed herein may comprise naturally occurring compounds or extracts or derivatives thereof. The compositions disclosed herein may comprise at least one organic, certified organic, US Department of Agriculture ("USDA") National Organic Program compliant ("NOP-compliant") ingredient. The compositions disclosed herein may comprise at least one ingredient that is food grade or generally recognized as safe (GRAS) under US law (sections 201(s) and 409 of the Federal Food, Drug, and Cosmetic Act), including direct food additives affirmed as GRAS. The use of food grade or GRAS ingredients enables the compositions disclosed herein to be used by consumers without rinsing of a treated surface after use.

The compositions disclosed herein may comprise less than about 15 ingredients, preferably less than about 10 ingredients.

The aqueous surfactant compositions may be subject to fluctuating temperatures during shipping, storage, and/or use. The aqueous surfactant composition described herein is stable at low temperatures (i.e., from about 5° ° C. to about 10° C.). The aqueous surfactant composition has a b* value from about 0 to about 5 and/or a turbidity of less than about 20 NTU, preferably even after repeated exposure to low temperatures and/or after recovery to room temperature from cold temperature exposure.

Hydrophobic Agents

The aqueous surfactant composition may comprise one or more hydrophobic agents. The aqueous surfactant composition may comprise from about 0.005% to about 15%, or from about 0.005% to about 12%, or from about 0.005% to about 10%, or from about 0.05% to about 15%, or from about 0.05% to about 12%, from about 0.15% to about 12%, or from about 0.05% to about 10%, or from about 0.5% to about 10%, or from about 1% to about 10%, by weight of the aqueous surfactant composition of a hydrophobic agent. Alternatively, the aqueous surfactant composition may be more concentrated and may comprise from about 5% to about 40%, or from about 7% to about 35%, or from about 10% to about 30%, by weight of the aqueous surfactant composition of a hydrophobic agent.

Hydrophobic agents include materials having an octanol water partition coefficient (at 25° C.) greater than about 1, preferably greater than about 1.2 and more preferably greater than about 1.5, where the octanol water partition coefficient of a material is defined as the ratio of the concentration of the material in the octanol phase to its concentration in the water phase at 25° C. Suitable hydrophobic actives for use herein include perfume oils, vitamin oils (e.g., vitamins A, D, E, and K), natural oils, such as the vegetable oils, e.g., sunflower oil, rapeseed oil, emollients, such as silicone oils and petrolatum, and ceramides.

Natural oils include, but are not limited to, coconut oil, babassu oil, castor oil, algae byproduct, beef tallow oil, borage oil, camelina oil, Canola® oil, choice white grease, coffee oil, corn oil, Cuphea Viscosissima oil, evening primrose oil, fish oil, hemp oil, hepar oil, jatropha oil, Lesquerella Fendleri oil, linseed oil, Moringa Oleifera oil, mustard oil, neem oil, palm oil, perilla seed oil, poultry fat, rice bran oil, soybean oil, stillingia oil, sunflower oil, tung oil, yellow grease, cooking oil, and other vegetable, nut, or seed oils. A natural oil typically includes triglycerides, free fatty acids, or a combination of triglycerides and free fatty acids, and other trace compounds.

Nonlimiting examples of vitamin oils and derivatives thereof include vitamin A compounds and natural and/or synthetic analogs of Vitamin A, such as retinoids, retinol, retinyl acetate, retinyl palmitate, retinoic acid, retinaldehyde, retinyl propionate, carotenoids (pro-vitamin A), and vitamin E compounds, or tocopherol, including tocopheryl sorbate, tocopheryl acetate.

Emollients are used in skin care products to lubricate the skin, increase the smoothness and suppleness of the skin, prevent or relieve dryness of the skin, and/or protect the skin. Emollients are typically water-immiscible, oily or waxy materials. Nonlimiting examples of emollients may include isopropyl isostearate, caprylic/capric triglycerides, petrolatum, dimethicone, dimethiconol, and mixtures thereof.

Ceramides are lipids consisting of a sphingosine linked to a fatty acid or fatty acid derivative via its amine function. Ceramides are used in skin care products and are believed to improve long-term moisturization of the skin. Suitable ceramides include ceramide 1, 2, 3, 3B, 4, 5, 61 and 6II. Preferably, the ceramide is selected from the group consisting of ceramide 2, ceramide 3, ceramide 3B, ceramide 4, and mixtures thereof.

Suitable hydrophobic agents may also include plant oils/essential plant oils (including synthetic analogues). Additional nonlimiting examples of hydrophobic agents include aldehyde C16 (pure), almond oil, alpha-terpineol, verbenone, alpha-cedrene, cinnamic aldehyde, amyl cinnamic aldehyde, cinnamyl acetate, amyl salicylate, anisic aldehyde, cedrol, benzyl acetate, cinnamaldehyde, cinnamic alcohol, carvacrol, carveol, citral, citronellal, citronellol, dimethyl salicylate, eucalyptol (also known as 1,8-cineole), thujopsene, isoeugenyl acetate, iso-eugenol, methyl isoeugenol, galaxolide, geraniol, guaiacol, ionone, menthol (e.g., L-menthol), menthone, carvone (e.g., L-carvone), camphor, p-cymene, bornyl acetate, isobornyl acetate, gamma-terpinene, methyl anthranilate, methyl ionone, methyl salicylate, nerol, alpha-phellandrene, pennyroyal oil, perillaldehyde, 1- or 2-phenyl ethyl alcohol, 1- or 2-phenyl ethyl propionate, piperonal, piperonyl acetate, piperonyl alcohol, D-pulegone, terpinen-4-ol, terpinyl acetate, 4-tert butylcyclohexyl acetate, thymol, trans-anethiol, vanillin, ethyl vanillin, castor oil, cedar oil, cinnamon, cinnamon oil, citronella, citronella oil, clove, corn oil, corn mint oil, cottonseed oil, garlic, garlic oil, linseed oil, mint, mint oil, thyme, peppermint, peppermint oil, spearmint, spearmint oil, rosemary, sesame, sesame oil, soybean oil, white pepper, licorice oil, wintergreen oil, star anise oil, lilac flower oil, black seed oil, grapefruit seed oil, grapefruit, lemon oil, orange oil, tea tree oil, tagete minuta oil, lavender oil, lippia javancia oil, oil of bergamot, galbanum oil, lavage oil, and combinations thereof.

Nonlimiting examples of essential oils can include thyme (thymol, carvacrol), oregano (carvacrol, terpenes), lemon (limonene, terpinene, phellandrene, pinene, citral), orange flower (linalool, ß-pinene, limonene), orange (limonene, citral), anise (anethole, safrol), clove (eugenol, cumenyl acetate, caryophyllene), rose (geraniol, citronellol), rosemary (borneol, bornyl esters, camphor), geranium (geraniol, citronellol, linalool), lavender (linalyl acetate, linalool), citronella (geraniol, citronellol, citronellal, camphene), eucalyptus (eucalyptol), peppermint (menthol, menthyl esters), spearmint (carvone, limonene, pinene), wintergreen (methyl salicylate), camphor (safrole, acetaldehyde, camphor), bay (eugenol, myrcene, chavicol), cinnamon (cinnamaldehyde, cinnamyl acetate, eugenol), tea tree (terpinen-4-ol, cineole), cedar leaf (α-thujone, β-thujone, fenchone), geranium (Citronellol, Geraniol, guaiadiene), Corn mint (Menthol, Menthone), garlic (dimethyl trisulfide, diallyl disulfide, diallyl sulfide, diallyl tetrasulfide, 3-vinyl-[4H]-1,2-dithiin), and combinations thereof.

The aqueous surfactant composition may comprise a hydrophobic agent selected from the group consisting of citronella oil, spearmint oil, corn mint oil, peppermint oil, and combinations thereof. The aqueous surfactant composition may comprise a hydrophobic agent selected from the group consisting of menthol, menthone, citronellol, citronellal, geraniol, limonene, carvone, pinene, and combinations thereof. The aqueous surfactant composition may comprise a hydrophobic agent selected from the group consisting of cedarwood oil, cinnamon leaf oil, clove oil, eugenol, garlic oil, geraniol, geranium oil, lemongrass oil, rosemary oil, thyme oil, and combinations thereof.

Alkyl Sulfate Surfactant

The aqueous surfactant compositions described herein may comprise from about 1% to about 20%, or from about 1% to about 18%, or from about 2% to about 15%, or from about 3% to about 10% by weight the composition, of an alkyl sulfate surfactant. The alkyl sulfate surfactant may optionally be derived from renewable fatty alcohol, where "renewable" refers to a fatty alcohol that is derived from renewable feedstock. e.g., plants, and contains renewable carbon. Preferably, the alkyl sulfate surfactant is non-ethoxylated.

The aqueous surfactant compositions described herein may comprise one or more alkyl sulfates of the formula $R^1$—O—$SO_3M$, where $R^1$ is a linear or branched, preferably linear, $C_6$-$C_{20}$, or $C_8$-$C_{18}$, or $C_{10}$-$C_{16}$, or $C_{12}$ alkyl group, and where M is an alkali metal, ammonium, alkyl ammonium, or alkanol ammonium cation. R' may comprise a distribution of carbon chain lengths, e.g., C11, C12, C13, C14, C15, C16. M may be an alkali metal or ammonium cation. R' may be derived from a renewable, natural oil, such as coconut oil, palm kernel oil, palm oil, or a mixture thereof. These oils contain the greatest concentration of triglycerides and free fatty acids having chain lengths ranging from C10 to C18, particularly C10 to C16, which are especially useful in detergent products.

It is understood that the alkyl sulfates described herein are typically not single compounds as suggested by the formula $R^1$—O—$SO_3M$, but rather, alkyl sulfates comprise a mixture of alkyl chain lengths ($R^1$). The single-surfactant compositions disclosed herein may comprise a mixture of alkyl sulfate of varying chain lengths, where the mixture may have an average (arithmetic mean) carbon chain length within the range of about 12 to about 16 carbon atoms, or an average carbon chain length of about 12 carbon atoms. A preferred alkyl sulfate surfactant is sodium lauryl sulfate or "SLS" (also known as sodium dodecyl sulfate).

The aqueous surfactant composition may comprise a hydrophobic agent (such as a perfume or an essential oil) and alkyl sulfate in a ratio of about 1:0.66 to about 1:20, or about 1:1 to about 1:10, or about 1:1 to about 1:5. It has been surprisingly found that if the ratio of hydrophobic agent to alkyl sulfate is too high, there may not be enough alkyl sulfate to emulsify the hydrophobic active ingredient. If the hydrophobic active ingredient is not sufficiently emulsified, then a layer of the hydrophobic ingredient, e.g., oil, may form on top of the composition, causing the composition to appear turbid when shaken. However, if the ratio of hydrophobic active ingredient to alkyl sulfate is too low, then there may be too much free alkyl sulfate, which may precipitate at cold temperatures.

Sodium lauryl sulfate is commercially available from Stephan Company located in Northfield, Ill.

Solvent

The aqueous surfactant composition may optionally comprise from about 1% to about 45%, or from about 1% to about 30%, or from about 1% to about 25%, or from about 1% to about 15%, by weight the composition, of one or more solvents. Liquid aqueous surfactant compositions may contain one or more solvents and water.

Suitable solvents include alcohols, such as monohydridic or polyhydridic alcohols. Preferred alcohols are low molecular weight primary or secondary alcohols exemplified by ethanol, propanol, and isopropanol, preferably isopropanol. Monohydric alcohols and polyols, such as those containing from 2 to about 6 carbon atoms and from 2 to about 6 hydroxy groups (e.g., ethylene glycol, glycerin, and 1,2-propanediol (also referred to as propylene glycol)), may also be used.

Suitable solvents can include esters. The aqueous surfactant composition may comprise from about 0.005% to about 15%, or from about 0.05% to about 12%, or from about 0.5% to about 10%, or from about 1% to about 7%, by weight of the composition, of one or more esters. Esters are commonly formed by reacting a carboxylic acid with a molecule comprising one or more hydroxyl groups. Examples of suitable carboxylic acids include acetic acid, formic acid, lactic acid, oxalic acid, propanoic acid, propiolic acid, butyric acid, isobutyric acid, caproic acid, adipic acid, benzoic acid, salicylic acid, caprylic acid and fatty acids. Nonlimiting examples of molecules comprising one or more hydroxyl groups include ethanol, propyl alcohol, isopropyl alcohol, butyl alcohol, sec-butyl alcohol, isobutyl alcohol, tert-butyl alcohol, ethylene glycol, propylene glycol, glycerol, polyglycerol, cyclohexanol, and benzyl alcohol. Examples of suitable esters include isopropyl myristate, myristyl myristate, isopropyl palmitate, octyl palmitate, isopropyl isothermal, butyl lactate, ethyl lactate, butyl stearate, triethyl citrate, glycerol monooleate, glyceryl dicaprylate, glyceryl dimyristate, glyceryl dioleate, glyceryl distearate, glyceryl monomyristate, glyceryl monooctanoate, glyceryl monooleate, glyceryl monostearate, decyl oleate, glyceryl stearate, isocetyl stearate, octyl stearate, putty stearate, isostearyl neopentanoate, PPG myristyl propionate, diglyceryl monooleate, and diglyceryl monostearate. The aqueous surfactant composition may comprise ethyl lactate, preferably from about 0.005% to about 15% ethyl lactate, alternatively from about 0.05% to about 12%, alternatively from about 0.5% to about 10%, alternatively from about 1% to about 7%, all by weight of the aqueous surfactant composition.

Additional solvents include lipophilic fluids, including siloxanes, other silicones, hydrocarbons, glycol ethers, glycerin derivatives such as glycerin ethers, perfluorinated amines, perfluorinated and hydrofluoroether solvents, low-volatility monofluorinated organic solvents, diol solvents, and mixtures thereof.

Suitable solvents include butyl lactate (including enantiomers thereof), vinegar, 1,2-propylene carbonate, isopropyl myristate, ethyl lactate (including enantiomers thereof), isopropyl alcohol, and glycerin.

pH Adjusting Agents

The aqueous surfactant composition may comprise a buffer system. The buffer system may comprise one or more pH adjusting agents. Non-limiting examples of pH adjusting agents may include malic acid, citric acid, fumaric acid, humic acid, acetic acid, monosodium citrate, sodium citrate, disodium citrate, trisodium citrate, trisodium citrate dehydrate, trisodium citrate pentahydrate, sodium acetate, and combinations thereof. Preferably, the pH adjusting agent is selected from the group consisting of sodium citrate, citric acid, sodium acetate, acetic acid, and combinations thereof.

The aqueous surfactant composition may comprise from about 0.01% to about 5% citric acid or a salt thereof, preferably about 0.1% to about 4%, more preferably about 1% to about 3.5%, all by weight of the aqueous surfactant composition. Citric acid may be added to the composition as citric acid anhydrous or citric acid monohydrate. Suitable examples of citric acid or a salt thereof include potassium citrate, sodium citrate, monopotassium citrate, tripotassium citrate, tripotassium citrate monohydrate, or dipotassium citrate. Without being limited by theory, it is believed that citric acid may also function as an active ingredient and/or as a chelant.

The buffer system may comprise an acid (such as citric acid and/or acetic acid) and its conjugate base (such as a salt of citric acid and/or acetic acid). When the aqueous surfactant composition comprises a buffer system, the acid is preferably citric acid or acetic acid and the conjugate base is preferably the sodium salt of the respective acid.

The pH of the aqueous surfactant composition may be from about 2.0 to about 12.0, alternatively from about 3.0 to about 10.0, alternatively from about 4.0 to about 8.0.

Preservatives

The aqueous surfactant composition may comprise one or more preservatives. As used herein a "preservative" is any substance or compound that is added to protect against decay, decomposition, or spoilage. Preservatives may be natural or synthetic. Preservatives may be antimicrobial preservatives, which inhibit the growth of bacteria or fungi, including mold, or antioxidants. Nonlimiting examples of preservatives include potassium sorbate, sodium benzoate, tocopherol (e.g., tocopherol acetate), calcium propionate, sodium nitrate, sodium nitrite, sulfites (sulfur dioxide, sodium bisulfite, potassium hydrogen sulfite, etc.), tetrasodium EDTA, and disodium EDTA. The aqueous surfactant composition may comprise from about 0.02% to about 4%, by weight of the aqueous surfactant composition, of a preservative, alternatively from about 0.1% to about 2%, alternatively from about 0.2% to about 1%, alternatively from about 0.3% to about 0.5%, preferably a preservative selected from the group consisting of potassium sorbate, sodium benzoate, tocopherol, and mixtures thereof. The aqueous surfactant composition may be substantially free of a preservative.

Adjuncts

The aqueous surfactant composition may comprise one or more optional adjunct ingredients selected from pH adjusting agents, builders, structurants or thickeners, clay soil removal/anti-redeposition agents, polymeric soil release agents, polymeric dispersing agents, polymeric grease cleaning agents, enzymes, enzyme stabilizing systems, bleaching compounds, bleaching agents, bleach activators, bleach catalysts, dye transfer inhibiting agents, chelating agents, suds suppressors, softeners, calcium salts, boric acid, dyes, colorants, fluorescent whitening agents, bluing agents, defoamers, bleaches, gums, binders, and combinations thereof.

The aqueous surfactant compositions described herein may comprise from about 0.1% to about 5%, or from about 1% to about 4%, or from about 1% to about 3% by weight the composition, of one or more cleaning polymers. Suitable cleaning polymers include carboxymethylcellulose, poly (vinyl-pyrrolidone), poly (ethylene glycol), poly(vinyl alcohol), poly(vinylpyridine-N-oxide), poly(vinylimidazole), polycarboxylates such as polyacrylates, maleic/acrylic acid copolymers and lauryl methacrylate/acrylic acid co-polymers.

The aqueous surfactant compositions may comprise one or more amphiphilic cleaning polymers, such as the compound having the following general structure: bis($(C_2H_5O)(C_2H_4O)n)(CH_3)—N^+—C_xH_{2x}—N^+—(CH_3)$-bis($(C_2H_5O)(C_2H_4O)n$), wherein n=from 20 to 30, and x=from 3 to 8, or sulphated or sulphonated variants thereof.

The aqueous surfactant compositions may comprise one or more alkoxylated polyalkylenimines or one or more alkoxylated polyamines.

The aqueous surfactant compositions may comprise amphiphilic alkoxylated grease cleaning polymers which have balanced hydrophilic and hydrophobic properties, such that they remove grease particles from fabrics and surfaces. The amphiphilic alkoxylated grease cleaning polymers may comprise a core structure and a plurality of alkoxylate groups attached to that core structure. These may comprise alkoxylated polyalkylenimines, for example, having an inner polyethylene oxide block and an outer polypropylene oxide block. Such compounds may include, but are not limited to, ethoxylated polyethyleneimine, ethoxylated hexamethylene diamine, and sulfated versions thereof. Polypropoxylated derivatives may also be included. A wide variety of amines and polyalklyeneimines can be alkoxylated to various degrees. A useful example is 600 g/mol polyethyleneimine core ethoxylated to 20 EO groups per NH and is available from BASF.

The aqueous surfactant compositions described herein may comprise alkoxylated polycarboxylates. Alkoxylated polycarboxylates such as those prepared from polyacrylates may be useful herein to provide additional grease removal performance. Chemically, these materials comprise polyacrylates having one ethoxy side-chain per every 7-8 acrylate units. The side-chains are of the formula $—(CH_2CH_2O)_m (CH_2)_nCH_3$ where m is 2-3 and n is 6-12. The side-chains are ester-linked to the polyacrylate backbone to provide a comb polymer type structure. The molecular weight can vary, but is typically in the range of about 2000 to about 50,000.

The aqueous surfactant compositions described herein may comprise amphilic graft co-polymers. Suitable amphilic graft co-polymers include amphiphilic graft co-polymers comprising (i) polyethyelene glycol backbone; and (ii) and at least one pendant moiety selected from polyvinyl acetate, polyvinyl alcohol, and mixtures thereof. A commercially available example of an amphilic graft co-polymer is Sokalan® HP22, supplied from BASF. Suitable polymers include random graft copolymers, for example, a polyvinyl acetate grafted polyethylene oxide copolymer having a polyethylene oxide backbone and multiple polyvinyl acetate side chains. The molecular weight of the polyethylene oxide backbone may be about 6000 and the weight ratio of the polyethylene oxide to polyvinyl acetate may be from about 40 to about 60, and the polyethylene oxide backbone may have no more than 1 grafting point per 50 ethylene oxide units.

The aqueous surfactant compositions of the present disclosure may contain one or more carboxylate polymers, such as a maleate/acrylate random copolymer or polyacrylate homopolymer. The carboxylate polymer may be a polyacrylate homopolymer having a molecular weight of from 4,000 Da to 9,000 Da, or from 6,000 Da to 9,000 Da.

The aqueous surfactant compositions of the present disclosure may contain one or more soil release polymers having a structure as defined by one of the following structures (I), (II) or (III):

$$-[(OCHR^1-CHR^2)_a-O-OC-Ar-CO-]_d \quad \text{(I)}$$

$$-[(OCHR^3-CHR^4)_b-O-OC-sAr-CO-]_e \quad \text{(II)}$$

$$-[(OCHR^5-CHR^6)_c-OR^7]_f \quad \text{(III)}$$

wherein:

a, b and c are from 1 to 200;

d, e and f are from 1 to 50;

Ar is a 1,4-substituted phenylene;

sAr is 1,3-substituted phenylene substituted in position 5 with $SO_3Me$;

Me is Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or mixtures thereof;

$R^1$, $R^2$, $R^3$, $R^4$, $R^5$ and $R^6$ are independently selected from H or $C_1$-$C_{18}$ n- or iso-alkyl; and $R^7$ is a linear or branched $C_1$-$C_{18}$ alkyl, or a linear or branched $C_2$-$C_{30}$ alkenyl, or a cycloalkyl group with 5 to 9 carbon atoms, or a $C_8$-$C_{30}$ aryl group, or a $C_6$-$C_{30}$ arylalkyl group. Suitable soil release polymers include polyester soil release polymers such as Repel-o-tex polymers, including Repel-o-tex® SF, SF-2 and SRP6 supplied by Rhodia. Other suitable soil release polymers include Texcare® polymers, including Texcare® SRA100, SRA300, SRN100, SRN170, SRN240, SRN300 and SRN325 supplied by Clariant. Other suitable soil release polymers are Marloquest® polymers, such as Marloquest® SL supplied by Sasol.

The aqueous surfactant compositions of the present disclosure may contain one or more cellulosic polymers. Suitable cellulosic polymers include alkyl cellulose, alkyl alkoxyalkyl cellulose, carboxyalkyl cellulose, alkyl carboxyalkyl cellulose. The cellulosic polymer(s) may be selected from the group consisting of carboxymethyl cellulose, methyl cellulose, methyl hydroxyethyl cellulose, methyl carboxymethyl cellulose, and mixtures thereof. The carboxymethyl cellulose may have a degree of carboxymethyl substitution from about 0.5 to about 0.9 and a molecular weight of from about 100,000 Da to about 300,000 Da.

Packaging and Dispensing

The aqueous surfactant compositions described herein may be packaged in any suitable container, including those constructed from paper, cardboard, plastic materials, and any suitable laminates, and the compositions may be dispensed in any number of suitable manners, such as spraying, e.g., pump-spray, trigger-spray, and the like.

The aqueous surfactant composition may be packaged in a container or bottle that is at least partially transparent or translucent. The container may comprise a transparent portion, such as a window. The transparent or translucent bottle may have a light transmittance of greater than 25% at wavelength of about 410-800 nm. Bottle materials that may be used include but are not limited to: polypropylene (PP), polyethylene (PE), polycarbonate (PC), polyamides (PA) and/or polyethylene terephthalate (PET), polyvinylchloride (PVC); and polystyrene (PS).

The transparent portion of the bottle or container may have a transmittance of more than about 25%, or more than about 30%, or more than about 40%, or more than about 50% in the visible part of the spectrum (approx. 410-800 nm). Alternatively, absorbency of the bottle may be measured as less than about 0.6 or by having transmittance greater than about 25%, where %

$$\frac{1}{10^{absorbancy}} \times 100\%$$

transmittance equals:

For purposes of the disclosure, as long as one wavelength in the visible light range has greater than about 25% transmittance, it is considered to be transparent/translucent.

Method for Making an Aqueous Surfactant Composition

The present disclosure also relates to a method for making an aqueous surfactant composition, where the composition comprises alkyl sulfate and a hydrophobic agent. The method of making an aqueous surfactant composition may comprise the steps of:

a. combining alkyl sulfate; a pH adjusting agent, wherein the pH adjusting agent is an acid; a hydrophobic agent, and optionally a solvent to form an alkyl sulfate premix;

b. separately combining water, optionally a pH adjusting agent, and optionally a preservative to form an aqueous phase; and c. combining the alkyl sulfate premix with the aqueous phase to form the aqueous surfactant composition;

wherein the aqueous surfactant composition has a pH of about 2.0 to 12.0.

Examples

The following examples are provided to help illustrate the aqueous surfactant compositions described herein. The exemplified compositions are given solely for the purpose of illustration and are not to be construed as limitations of the present invention, as many variations thereof are possible without departing from the spirit and scope of the invention. All parts, percentages, and ratios herein are by weight unless otherwise specified.

TABLE 1

| Ingredient (Weight percent) | A | B | C | D | E | F | G |
|---|---|---|---|---|---|---|---|
| Sodium Lauryl Sulfate | 8.25 | 8.25 | 8.25 | 8.25 | 8.25 | 8.25 | 8.25 |
| Citric Acid | 1.50 | 1.50 | 1.50 | 1.50 | 1.50 | 1.50 | 1.50 |
| Isopropyl Alcohol | 2.04 | 2.23 | 2.09 | 2.07 | 1.99 | 2.34 | 2.62 |
| Cornmint Redistilled Oil[1] | 3.00 | 0 | 0 | 0 | 0 | 0 | 0 |
| Peppermint Organic Oil[2] | 0 | 3.00 | 0 | 0 | 0 | 0 | 0 |

TABLE 1-continued

| Ingredient (Weight percent) | A | B | C | D | E | F | G |
|---|---|---|---|---|---|---|---|
| Peppermint Yakima Redistilled[3] | 0 | 0 | 3.00 | 0 | 0 | 0 | 0 |
| Peppermint Indian Oil[4] | 0 | 0 | 0 | 3.00 | 0 | 0 | 0 |
| Spearmint Chinese Oi1[5] | 0 | 0 | 0 | 0 | 3.00 | 0 | 0 |
| Citronella Java Oil[6] | 0 | 0 | 0 | 0 | 0 | 3.00 | 0 |
| Lemongrass Organic Oil[7] | 0 | 0 | 0 | 0 | 0 | 0 | 3.00 |
| Sodium Citrate | 1.38 | 1.38 | 1.38 | 1.38 | 1.38 | 1.38 | 1.38 |
| Sodium Benzoate | 0.30 | 0.30 | 0.30 | 0.30 | 0.30 | 0.30 | 0.30 |
| Water | QS | QS | QS | QS | QS | QS | QS |

[1]Available from Lebermuth (South Bend, IN).
[2]Available from Lebermuth (South Bend, IN).
[3]Available from Lebermuth (South Bend, IN).
[4]Available from Lebermuth (South Bend, IN).
[5]Available from Lebermuth (South Bend, IN).
[6]Available from Lebermuth (South Bend, IN).
[7]Available from Lebermuth (South Bend, IN).

TABLE 2

| Ingredient (Weight percent) | H | I | J | K | L | M | N |
|---|---|---|---|---|---|---|---|
| Sodium Lauryl Sulfate ("SLS") | 8.25 | 8.25 | 8.25 | 8.25 | 8.25 | 8.25 | 10.00 |
| Citric Acid | 1.50 | 1.50 | 1.50 | 1.50 | 1.50 | 1.50 | 3.25 |
| Isopropyl Alcohol | 3.00 | 2.64 | 2.04 | 1.45 | 0.56 | 0.00 | 0.00 |
| Cornmint Redistilled Oil ("CM Oil")[1] | 0.00 | 1.0 | 3.00 | 5.00 | 8.00 | 10.00 | 10.00 |
| Sodium Citrate | 1.38 | 1.38 | 1.38 | 1.38 | 1.38 | 1.38 | 1.38 |
| Sodium Benzoate | 0.30 | 0.30 | 0.30 | 0.30 | 0.30 | 0.30 | 0.30 |
| Water | QS | QS | QS | QS | QS | QS | QS |

[1]Available from Lebermuth (South Bend, IN).

TABLE 3

| Ingredient (Weight percent) | O | P | Q | R | S |
|---|---|---|---|---|---|
| Sodium Lauryl Sulfate ("SLS") | 8.25 | 8.25 | 8.25 | 8.25 | 10.00 |
| Citric Acid | 1.50 | 1.50 | 1.50 | 1.50 | 3.25 |
| Isopropyl Alcohol | 2.07 | 1.49 | 0.63 | 0.06 | 0.06 |
| Peppermint Indian Oil ("PM Oil")[4] | 3.00 | 5.00 | 8.00 | 10.00 | 10.00 |
| Sodium Citrate | 1.38 | 1.38 | 1.38 | 1.38 | 1.38 |
| Sodium Benzoate | 0.30 | 0.30 | 0.30 | 0.30 | 0.30 |
| Water | QS | QS | QS | QS | QS |

[4]Available from Lebermuth (South Bend, IN).

TABLE 4

| Ingredient (Weight percent) | T | U | V |
|---|---|---|---|
| Sodium Lauryl Sulfate ("SLS") | 8.25 | 8.25 | 8.25 |
| Citric Acid | 1.50 | 1.50 | 1.50 |
| Isopropyl Alcohol | 1.99 | 1.36 | 0.42 |
| Spearmint Chinese Oil ("SP Oil")[5] | 3.00 | 5.00 | 8.00 |
| Sodium Citrate | 1.38 | 1.38 | 1.38 |
| Sodium Benzoate | 0.30 | 0.30 | 0.30 |
| Water | OS | QS | QS |

[5]Available from Lebermuth (South Bend, IN).

TABLE 5

| Ingredient (Weight percent) | W | X |
|---|---|---|
| Sodium Lauryl Sulfate ("SLS") | 8.25 | 8.25 |
| Citric Acid | 1.50 | 1.50 |
| Isopropyl Alcohol | 2.34 | 1.94 |
| Citronella Java Oil ("CT Oil")[6] | 3.00 | 5.00 |
| Sodium Citrate | 1.38 | 1.38 |
| Sodium Benzoate | 0.30 | 0.30 |
| Water | QS | QS |

[6]Available from Lebermuth (South Bend, IN).

Test Methods

Determination of the Hunter L.a.b. (CIE) b* Value

The formation of yellow color is measured using the Hunter L.a.b. (CIE) method. The b* value is determined using a HunterLab ColorFlex EZ® spectrophotometer (HunterLab, 11491 Sunset Hills Road, Reston, Virginia 20190). The methodology that is used is described in detail in the "User's Manual for ColorFlex EZ Version 2.2."

The HunterLab ColorFlex EZ® spectrophotometer uses a xenon flash lamp to illuminate a sample. The light reflected from the sample is then separated into its component wavelengths through a dispersion grating. The relative intensities of the light at different wavelengths along the visible spectrum (400-700 nm) are then analyzed to produce a number result indicative of the color of the sample.

Turbidity Method

A turbidimeter is used to measure the turbidity of aqueous surfactant compositions. This instrument measures the turbidity of liquids in Nephelometric Turbidity Units (NTU). The method of measuring turbidity is described in detail in the following reference: Hach 2100Q and 2100Qis User Manual, Edition 6, 08/2021, from the Hach Company. If a sample is not homogenous prior to analysis, the sample is inverted until it appears homogenous and is then poured into an analyte vile for measurement.

This method of measurement determines quantitative values of turbidity by evaluating the ratio of a primary nephelometric light scatter signal to a transmitted light scatter signal. This particular method of evaluation provides values between 0-1000 NTU, where increasing NTU values indicate more turbid compositions. In between each test sample, water controls may be measured to ensure proper equipment operation. For example, water may have a turbidity of about 1.11 NTU and isopropyl alcohol may have a turbidity of about 0.15 NTU. It is believed that improved emulsification of active ingredients, particularly hydrophobic active ingredients, yields lower NTU values.

Temperature Stability

Temperature stability is measured by filing 24-ounce PET vials with the sample composition. The vials are sealed and stored at 5° C. for 12 to 14 hours. The vials are then moved to 25° C. for 10 to 12 hours, completing one cold temperature cycle. This is repeated two more times, for a total of three cold temperature cycles. After the final incubation at 5° C. (and prior to the vials warming to room temperature), the vials are observed for any visual signs of turbidity or phase separation. After the final incubation at 25° C., the vials are assessed for turbidity and b* value using the Turbidity and Hunter L.a.b. (CIE) method described above.

Particle Size Test Method

Particle size is measured by light scattering data techniques. Particle size is determined with a Malvern Zetasizer Nano ZSP (Malvern Panalytical, Malvern, United Kingdom), or the like. The software used for control of the instrument and for data acquisition is the Malvern Zetasizer Software version 8.01.4906 (Malvern Panalytical). All samples are kept at 25° C., unless otherwise specified.

Samples are measured in BRAND® polystyrene disposable cuvettes (Cat. No. 759070D or equivalent). 1 mL of the sample is added into the cuvette using a disposable transfer pipette (VWR, Cat. No. 414004-004 or equivalent), swirled, and then discarded. Another 1 mL of the sample is added into the cuvette using a disposable transfer pipette. The cap is placed on the cuvette and all sides of the cuvette are wiped with lint-free lens paper. The cuvette is loaded into the instrument in accordance with the manufacture's specification to ensure light is passing correctly into the sample during the measurement, and the lid is closed.

The instrument is readied in accordance with manufacture's specification. The particle size measurements are made through the software with the following settings:

1) Under the 'Measure' section, the 'Manual' option is selected. 'Measurement Type' is then set to 'Size'.

2) The 'Sample' section is then selected. In the 'Material' subsection: 'Material' is chosen to be 'SDS'; the 'RI' is set to 1.461; and the 'Absorption' is set to 0.001. In the 'Dispersant' subsection: 'Dispersant' is selected as 'Water'; 'Temperature' is set to 25.0 deg C.; 'Viscosity' is set at 0.8872 cP; and 'RI' is set as 1.330. In the 'General options' subsection 'Mark-Houwink Parameters' is selected, 'A Parameter' is set to 0.428; and 'K Parameter ($cm^2/s$)' is set to 7.67e-05. In the 'Temperature' subsection: 'Temperature' is set as 25.0 deg C.; 'Equilibration Time (second)' is set to 120. In the 'Cell' subsection: 'Cell Type' is selected to be 'Disposable cuvettes'; and the 'DTS0012' option is selected.

3) The 'Measurement' section is then selected. The 'Angle of Detection Measurement Angle' is selected as '1730 Backscatter (NIBS default)'; 'Measurement Duration' is selected as 'Automatic'; 'Number of Runs' is set to 11; 'Run duration (seconds)' is set to 10; 'Number of Measurements' is set as 3; 'Delay between Measurements (seconds)' is set to 0; 'Append Measurement Number to Sample Name' is selected; and 'Allow Results to be Saved Containing Correlation Data Only' is not selected. In the 'Advanced' subsection: 'Measurement duration, Extend Duration for Large Part' is set to 'No'; 'Measurement settings, Positioning method' is set to 'Seek for Optimum Position'; and Automatic attenuation selection is set to 'Yes'.

4) The 'Data Processing' section is then selected, and the following options are selected: 'Analysis Model' is selected as 'General Purpose (Normal Resolution)'. The 'Size Analysis Parameters' are set to: 'Analysis Details'; 'Name' is set to 'Customized', 'Description' is set to 'Customized Analysis'; 'Display Range' is set with the 'Lower Limit' set to 0.6 and 'Upper Limit' set to 6000; 'Multimodal—analysis, Resolution' is selected to 'Normal'; 'Size classes, Number of size classes' is set as 70; 'Lower Size Limit' is set as 0.4; 'Upper Size Limit' is set as 10,000; 'Lower Threshold' is set as 0.05; and 'Upper Threshold' is set as 0.01. In the 'Reports' subsection: 'Print Report' is not selected and in the 'Export' subsection: 'Export' results is not selected.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A composition comprising:

from about 65% to about 85% by weight of the composition of water;

from about 3% to about 10% by weight of the composition of sodium lauryl sulfate;

from about 1% to about 15% by weight of the composition of a hydrophobic agent, wherein the hydrophobic agent is selected from the group consisting of geraniol, menthol, carvone, and mixtures thereof;

from about 1% to about 4% by weight of the composition of a preservative, wherein the preservative is selected from the group consisting of potassium sorbate, sodium benzoate, tocopherol, and mixtures thereof;

from about 1% to about 15% by weight of the composition of a first solvent, wherein the first solvent is triethyl citrate;

from about 1% to about 15% by weight of the composition of a second solvent, wherein the second solvent is isopropanol; and a pH adjusting agent, wherein the pH adjusting agent is selected from the group consisting of citric acid, malic acid, acetic acid, fumaric acid, humic acid, and mixtures thereof;

wherein the ratio of hydrophobic agent to sodium lauryl sulfate is from about 1:0.66 to 1:5, the composition has a turbidity less than about 20 NTU, and the composition has a b* value of about 0 to about 5.

2. The composition of claim 1, wherein the composition has a pH of from about 4.0 to about 8.0.

3. The composition of claim 1, wherein the hydrophobic agent is geraniol.

4. The composition of claim 1, wherein the composition is packaged in a container, wherein at least a portion of the container is transparent or translucent.

5. The composition of claim 4, wherein the portion of the container has a transmittance of greater than about 50% at a wavelength from about 410 nm to about 800 nm.

6. The composition of claim 4, wherein the container is made from polyethylene terephthalate.

7. The composition of claim 1, wherein the composition comprises particles having an intensity mean particle size from about 2 nm to about 100 nm.

8. The composition of claim 1, wherein the composition has a VOC content from about 2% to about 20% by weight of the composition.

9. The composition of claim 1, comprising from about 1% to about 10% by weight of the composition of the hydrophobic agent.

10. A composition comprising:

from about 65% to about 85% by weight of the composition of water;

from about 3% to about 10% by weight of the composition of sodium lauryl sulfate;

from about 1% to about 15% by weight of the composition of a hydrophobic agent, wherein the hydrophobic agent is selected from the group consisting of geraniol, cornmint oil, spearmint oil, rosemary oil, lemongrass oil, and mixtures thereof;

from about 1% to about 4% by weight of the composition of a preservative, wherein the preservative is selected from the group consisting of potassium sorbate, sodium benzoate, tocopherol, and mixtures thereof;

from about 1% to about 15% by weight of the composition of a first solvent, wherein the first solvent is triethyl citrate; and a pH adjusting agent, wherein the pH adjusting agent is selected from the group consisting of malic acid, citric acid, fumaric acid, humic acid, acetic acid, monosodium citrate, sodium citrate, disodium citrate, trisodium citrate, trisodium citrate dehydrate, trisodium citrate pentahydrate, sodium acetate, and combinations thereof;

wherein the ratio of hydrophobic agent to sodium lauryl sulfate is from about 1:0.66 to 1:5, the composition has a pH from about 4.0 to about 8.0, and the composition has a turbidity less than about 20 NTU.

11. The composition of claim 10, wherein the composition has a b* value of about 0 to about 5.

12. The composition of claim 10, wherein the composition is packaged in a container, wherein at least a portion of the container is transparent or translucent.

13. The composition of claim 12, wherein the container is made from polyethylene terephthalate.

14. The composition of claim 10, wherein the composition has a VOC content from about 2% to about 20% by weight of the composition.

15. The composition of claim 10, wherein the preservative is potassium sorbate.

16. The composition according to claim 15, wherein the composition comprises from about 2% to about 4% potassium sorbate.

17. The composition of claim 10, wherein the composition further comprises from about 1% to about 25% by weight of the composition of a second solvent, wherein the second solvent is selected from the group consisting of isopropanol, glycerin and mixtures thereof.

18. The composition of claim 10, comprising from about 1% to about 10% by weight of the composition of the hydrophobic agent.

* * * * *